United States Patent
Kim

(10) Patent No.: US 7,477,369 B2
(45) Date of Patent: Jan. 13, 2009

(54) APPARATUS FOR TESTING LIQUID CRYSTAL DISPLAY DEVICE AND TESTING METHOD THEREOF

(75) Inventor: Dong-Guk Kim, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 216 days.

(21) Appl. No.: 10/985,911

(22) Filed: Nov. 12, 2004

(65) Prior Publication Data

US 2005/0104615 A1    May 19, 2005

(30) Foreign Application Priority Data

Nov. 13, 2003    (KR)    ...................... 10-2003-0080296

(51) Int. Cl.
*G01N 21/00*    (2006.01)
(52) U.S. Cl. .................... 356/237.1; 324/770
(58) Field of Classification Search .............. 356/237.1; 324/770
See application file for complete search history.

(56) References Cited

U.S. PATENT DOCUMENTS

| | | | | |
|---|---|---|---|---|
| 4,819,038 A | * | 4/1989 | Alt | .............. 324/770 |
| 5,258,705 A | * | 11/1993 | Okamoto et al. | ............. 324/770 |
| 5,614,839 A | * | 3/1997 | Bosacchi | .................... 324/770 |
| 6,798,231 B2 | * | 9/2004 | Iwasaki et al. | .............. 324/770 |
| 7,126,577 B2 | * | 10/2006 | Zhou et al. | .................. 345/107 |

FOREIGN PATENT DOCUMENTS

| | | |
|---|---|---|
| JP | 05-273590 | 10/1993 |
| JP | 5303068 | 11/1993 |
| JP | 09-050012 | 2/1997 |
| JP | 2003-029305 | 1/2003 |
| JP | 2003-122266 | 4/2003 |
| JP | 2003-270678 | 9/2003 |
| JP | 2003 295235 | * 10/2003 |

OTHER PUBLICATIONS

Pham, et al; "*10.2: Electro-Optical Characteristics of the Gyricon Display*"; SID Digest; pp. 119-121; 2002.
Amundson, et al,; "*12.3: Flexible, Active-Matrix Display Constructed Using a Microencapsulated Electrophoretic Material and Organic-Semiconductor-Based Backplane.*"; SID Digest; pp. 160-163; 2001.
Webber, Richard ; "*10.4: Image Stability in Active-Matrix Microencapsulated Electrophoretic Display*"; SID Digest ; pp. 126-129 ; 2002.
Duthaler, et al ; "*53.1: Active-Matrix Color Displays Using Electrophorectic Ink and Color Filters*"; SID Digest ; pp. 1374-1377 ; 2002.

* cited by examiner

*Primary Examiner*—Michael A Lyons
*Assistant Examiner*—Juan D Valentin
(74) *Attorney, Agent, or Firm*—McKenna Long & Aldridge LLP

(57) ABSTRACT

An apparatus for testing a liquid crystal display (LCD) device includes a TFT (thin film transistor) array substrate to be tested; a modulator installed above the TFT array substrate and including a transparent substrate and an electrophoretic film; and a camera installed above the modulator, for measuring brightness of an image.

21 Claims, 4 Drawing Sheets

APPARATUS FOR TESTING LIQUID CRYSTAL DISPLAY DEVICE AND TESTING METHOD THEREOF

This application claims the benefit of Korean Patent Application No. 2003-80296, filed on Nov. 13, 2003, which is hereby incorporated by reference for all purposes as if fully set forth herein.

BACKGROUND OF THE INVENTION

1. Field of the Invention

The present invention relates to a liquid crystal display device, and particularly to an apparatus for testing a liquid crystal display device and testing method which is suitable for a large size liquid crystal display device and can reduce a testing time.

2. Description of the Related Art

The growth in demand for various portable electronic devices, such as mobile phones, personal digital assistants (PDAs), and notebook computers has increased the demand for light weight, thin profile, small flat panel display devices. Such flat panel display devices include liquid crystal display (LCD) devices, plasma display panel (PDP) devices, field emission display (FED) devices, and vacuum fluorescent display (VFD) devices. Of these different devices, the LCD devices are actively developed due to their simple mass-production techniques, their easy driving systems, and high picture quality.

The LCD device includes a lower substrate, an upper substrate and a liquid crystal layer formed between these two substrates. The lower substrate is a driving device array substrate, and includes a plurality of pixels. A driving device such as a thin film transistor is formed at each pixel. An upper substrate is a color filter substrate, and includes a color filter layer for implementing actual colors. In addition, a pixel electrode and a common electrode are formed on the lower substrate and the upper substrate, respectively, and an alignment film for aligning liquid crystal molecules is applied on the pixel electrode and the common electrode.

The lower substrate and the upper substrate are attached together by a sealant formed along an outer edge of the substrate. Spacers formed between the upper substrate and the lower substrate maintain a uniform cell gap. Liquid crystal molecules are driven by a driving device formed on the lower substrate, wherein the quantity of light transmitted through the liquid crystal layer is controlled to display an image.

In the LCD device having such a structure, the lower substrate is formed by a driving device array substrate process for forming a driving device, and the upper substrate is formed by a color filter substrate process for forming a color filter.

In the driving device array substrate process, a plurality of gate lines and a plurality of data lines arranged on the lower substrate that cross to define pixel regions are formed. A thin film transistor, a driving device connected to the gate lines and the data lines, is formed at each pixel region, and then a pixel electrode connected to the thin film transistor is formed to drive the liquid crystal layer when a signal is applied thereto through the thin film transistor.

In addition, in the color filter substrate process, a black matrix is formed on the upper substrate, then a color filter is formed thereon, and finally a common electrode is formed thereafter.

Thereafter, the two substrates are attached together by a spacer and sealant forming process, and then the attached substrates are cut into panel units thereby completing a liquid crystal display panel.

Before the two substrates are attached, a testing process is additionally carried out to detect defects such as a short or open circuit of the thin film transistor and between lines formed on a thin film transistor (TFT) array substrate.

FIG. 1 is a schematic view illustrating a method for testing a TFT array substrate.

As shown, an apparatus 1 for testing the TFT array substrate includes a TFT array substrate 10 to be tested; a modulator 35 installed above the TFT array substrate 10; and a camera 40 installed above the modulator 35.

The modulator 35 includes Polymer Dispersed Liquid Crystal (PDLC 30) layer injected between a substrate 20 on which a transparent electrode 31 is formed and a reflecting plate 33. The PDLC layer 30 is formed of liquid crystal drops obtained by mixing liquid crystal with polymer and then separating the liquid crystal from the polymer by emitting ultraviolet rays to the mixture. The PDLC layer 30 is made of an epoxy resin containing a resin and a hardener. The PDLC layer 30 is driven by a voltage difference between the transparent electrode 31 formed on the substrate 20 of the modulator 35 and the pixel electrode 11 formed on the TFT array substrate 10.

If a voltage is not applied to the PDLC layer 30, liquid crystal drops are randomly arranged, thereby diffusing incident light. Thus, a dark image is observed in the camera 40. In contrast, if a voltage is applied to the transparent electrode 31 and the pixel electrode 11, the liquid crystal molecules in the liquid crystal drops of the PDLC layer 30 are arranged parallel to an electric field to thereby reflect incident light with a reflecting plate 33 and transmit the reflected light. Thus, a bright image is observed in the camera 40. Accordingly, the brightness of an image displayed from the camera is observed by changing the voltage between the pixel electrode 11 formed on the TFT array substrate 10 and the transparent electrode 31 formed at the modulator 30.

When a defect such as an open or short circuit occurs at the TFT array substrate 10, the brightness of an image in that region as observed through the camera becomes different from that of another region, making the defect easily detected.

However, the related art apparatus for testing the TFT array substrate having such a structure has a number of problems, including the following.

First, because the modulator 35 used for an existing testing apparatus has a reflection plate formed by alternately laminating $TiO_2$ and $SiO_2$, manufacturing a large size modulator is difficult. Accordingly, to test an entire surface of the TFT array substrate, the test has to be repetitively carried out with the modulation moved. For this reason, the test takes a long time to complete and the modulator is not suitable for a large size liquid crystal display device.

In addition, the modulator 35 maintains a distance of approximately 10~20 μm from the TFT array substrate 10. When using an organic passivation layer to secure an aperture ratio in a TFT array substrate 10 process, a protrusion may be formed at the substrate's surface. If the reflecting plate of the modulator comes in contact with the protrusion, the reflecting plate is torn. Accordingly, the modulator has to be replaced with new one, thereby increasing cost.

SUMMARY OF THE INVENTION

An advantage of the present invention is to provide an apparatus for testing an liquid crystal display device which is suitable for a large size liquid crystal display device and can shorten a testing time by using an electrophoretic film such as a MEP (Microencapsulated Electrophoretic) film, instead of a PDLC layer, in a modulator of a testing apparatus used to test a TFT array substrate.

To achieve these and other advantages and in accordance with the purpose of the present invention, as embodied and broadly described herein, there is provided an apparatus for testing a liquid crystal display device comprising a TFT (thin film transistor) array substrate to be tested; a modulator installed above the TFT array substrate and including a transparent electrode formed on a transparent substrate and an MEP (microencapsulated electrophoretic) film; and a camera installed above the modulator, for measuring the brightness of an image.

In addition, a light source for emitting light to the modulator is further included, and the TFT array substrate comprises a transparent substrate; a plurality of gate lines and a plurality of data lines arranged vertically and horizontally on the transparent substrate to define pixels; a thin film transistor formed at each crossing of the gate lines and the data lines; and a pixel electrode formed at each pixel region and electrically connected to the thin film transistor.

To achieve these and other advantages and in accordance with the purpose of the present invention, as embodied and broadly described herein, there is provided an apparatus for testing a liquid crystal display device comprising: a TFT (thin film transistor) array substrate to be tested; a modulator installed above the TFT array substrate and including a transparent electrode formed on a transparent substrate and electronic paper; and a camera installed above the modulator, for measuring the brightness of an image.

To achieve these and other advantages and in accordance with the purpose of the present invention, as embodied and broadly described herein, there is provided a method for testing a liquid crystal display device comprising: providing a test substrate including a first transparent substrate; placing a modulator disposed at a predetermined interval from the test substrate and including a second transparent electrode and an MEP film including electronic ink; emitting light to the modulator; applying a voltage between the first transparent electrode and the second transparent electrode; separating the electronic ink to upper and lower sides according to polarity by a voltage between the first and second transparent electrodes; and observing by a camera, the brightness of light reflected or absorbed (non-reflected) by the electronic ink separated to the upper and lower sides.

As described above, the present invention provides an apparatus for testing a TFT array substrate including a modulator having an electrophoretic film such as an MEP (microencapsulated electrophoretic) film or electronic paper and its testing equipment.

The electrophoretic film has a characteristic that particle groups having different polarities are separated by an external electric field, and an electrophoretic film comprising white particles and black particles, for example, an MEP film or electron, is used for a modulator in the present invention.

The modulator of the testing equipment according to the present invention is advantageous in that a test on a large size LCD device can be easily made, and testing time can be reduced because a modulator of large size can be manufactured. Compared to a PDLC layer used for the related art modulator and that requires a special reflecting plate made by alternately laminating $TiO_2$ and $SiO_2$, which results in difficulties in making the modulator have large size, an electrophoretic film used in the present invention, namely an MEP (microencapsulated electrophoretic) film or electronic paper, does not require a reflecting plate because of its own excellent reflecting characteristic, so that a large size modulator can be manufactured.

The foregoing and other features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
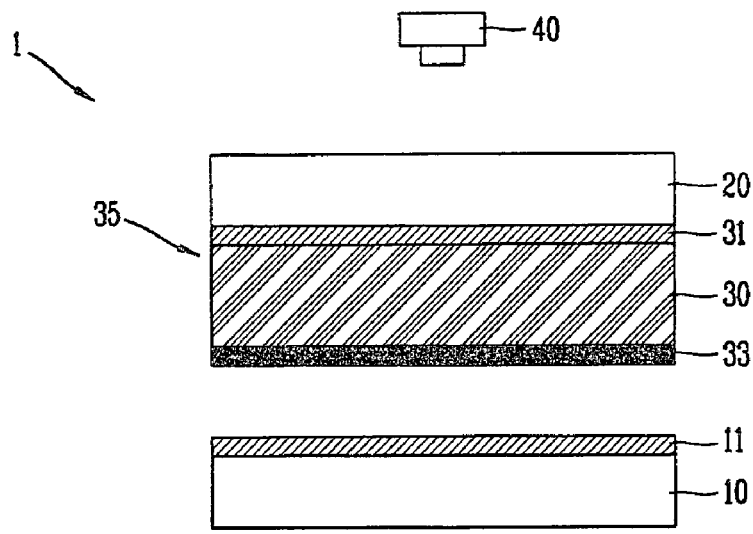
FIG. 1 is a schematic view illustrating an apparatus for testing a related liquid crystal display device.
Figure 2:
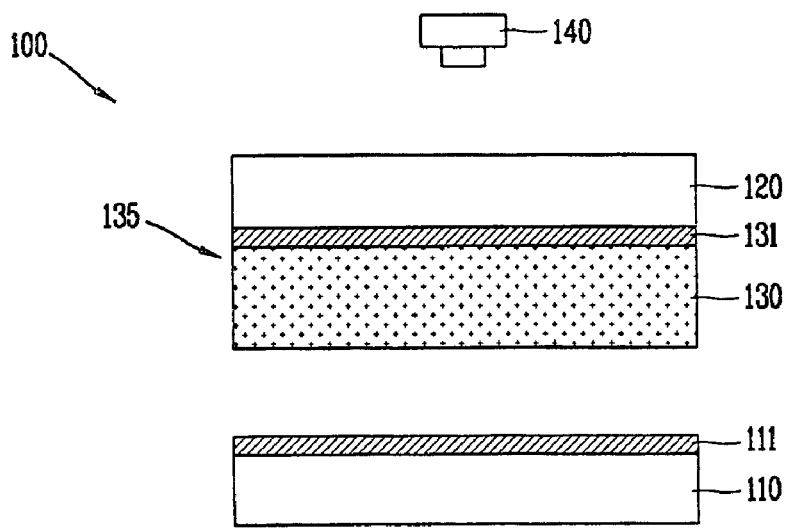
FIG. 2 is a schematic view illustrating an apparatus for testing a liquid crystal display device in accordance with one embodiment of the present invention.
Figure 3:
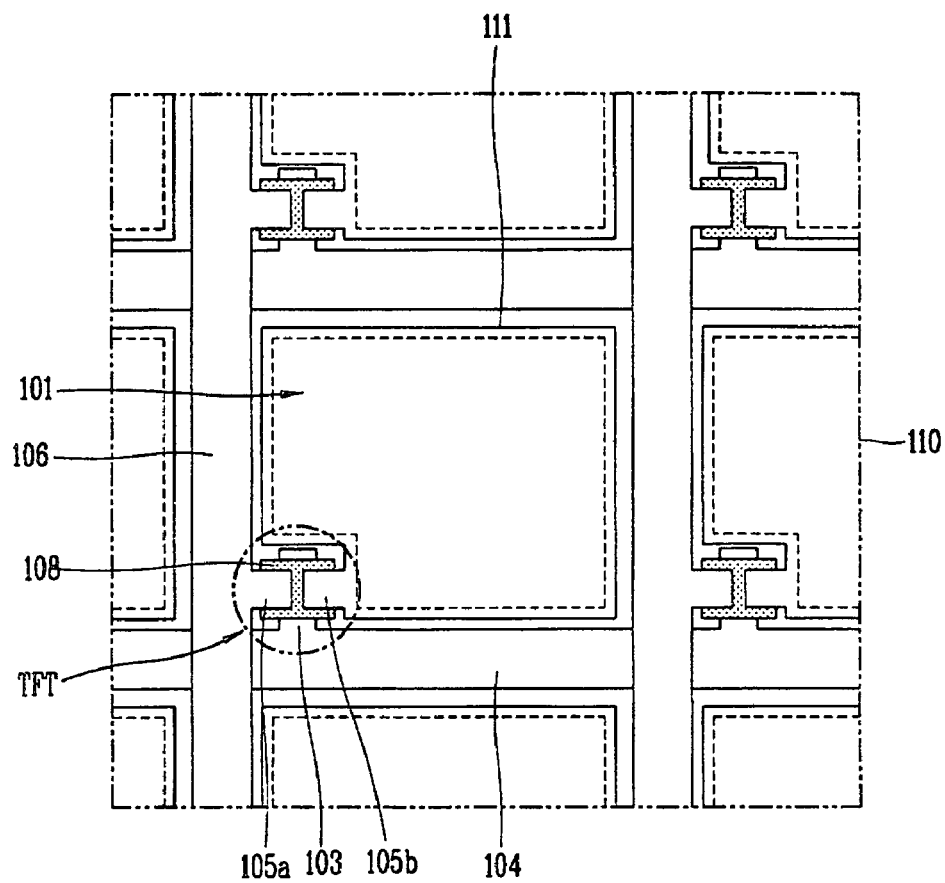
FIG. 3 is a view illustrating a TFT array substrate in detail.
Figure 4:
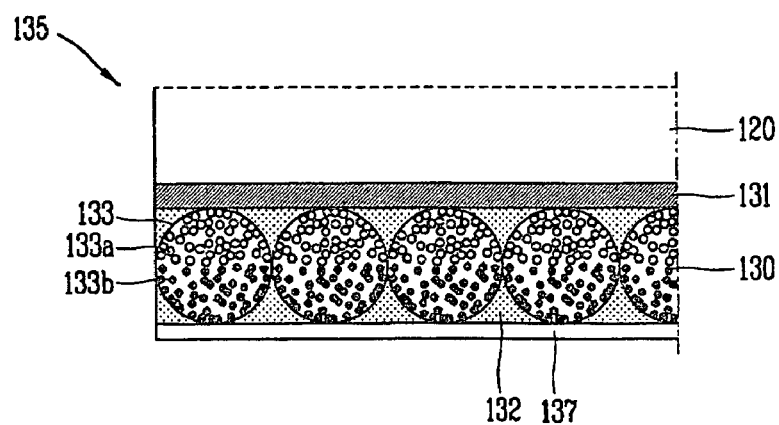
FIG. 4 is a view illustrating a modulator of a testing apparatus in detail.
Figure 5:
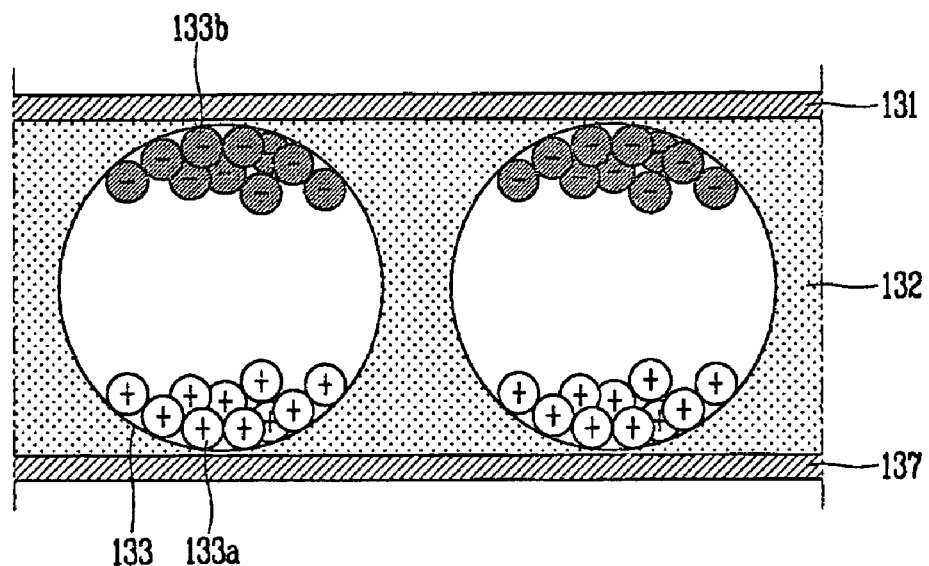
FIG. 5 is a view illustrating an MEP film of a modulator in detail.

FIGS. 2 to 3 illustrate one embodiment of the present invention, wherein FIG. 2 is a schematic cross-sectional view illustrating a testing apparatus in accordance with the present invention, and FIG. 3 is a plan view of a TFT array substrate. FIG. 4 is a view illustrating a modulator of a testing apparatus in detail, and FIG. 5 is a view illustrating driving of electronic ink, which is generated inside an MEP film of a modulator upon receiving an electric field.

First, as shown in FIG. 2, an apparatus 100 for testing an LCD device in accordance with one embodiment of the present invention includes a TFT array substrate 110 to be tested, a modulator 135 including an MEP film (Microencapsulated Electrophoretic Film) 130; and a camera 140 for observing the brightness of the modulator 135.

As shown in FIG. 3, the TFT array substrate 100 includes gate lines 104 and data lines 106 arranged horizontally and vertically to define pixels 101; and a TFT (thin film transistor) formed at each crossing of the gate lines 104 and the data lines 106. The TFT includes a gate electrode 103 connected to the gate line 104; a semiconductor layer 108 formed on the gate electrode 103 and activated as a scan signal is applied to the gate electrode 103; and source/drain electrodes 105 formed on the semiconductor layer 108. A pixel electrode 111, which is connected to the source/drain electrodes 105a/105b to operate liquid crystal (not shown) upon receiving a scan signal through the source/drain electrodes 105a/105b as the semiconductor layer 108 is activated, is formed at a display region of the pixel 101. Here, the pixel electrode 111 is made of a transparent conductive material such as ITO (indium tin oxide) or IZO (indium zinc oxide), and hereinafter, the pixel electrode 111 will be referred to as a first transparent electrode.

In the LCD device having such a structure, the source/drain electrodes 105a/105b of the TFT are electrically connected to the pixel electrode 111 formed in the pixel, and liquid crystal is driven as a signal is applied to the pixel electrode 111 through the source/drain electrodes 105a/105b, thereby displaying an image.

As shown in FIG. 4, as for the modulator 135, a second transparent electrode 131 may be made of the same material as that of the first transparent electrode 111 of the TFT array substrate 110 is formed on a transparent substrate 120 made of glass or plastic, and an MEP film 130 is formed thereon. Also, a protection film 137 for protecting the MEP film 130 may be provided on the surface of the MEP film 130.

An advantage of the MEP film 130 is that electronic ink forms a capsule 133 in a polymer binder 132, and the electronic ink distributed in the capsule 133 includes white pigment 133a and black pigment 133b.

As shown in FIG. 5, the white pigment 133a and the black pigment 133b has a positive (+) charge characteristic and a negative (−) charge characteristic, respectively, the white pigment 133a is charged positively (+), and the black pigment 133b is charged negatively (−). Accordingly, if a voltage is applied to the first transparent electrodes 111 and second transparent electrode 131, the white pigment 133a and the black pigment 133b are separated by an electric field generated between the two electrodes 111 and 131. For example, if a negative (−) voltage is applied to the first transparent electrode 111 and a positive (+) voltage is applied to the second transparent electrode 131, the white pigment 133a assuming a positive (+) charge is moved toward the first transparent electrode 111, and the black pigment 133b assuming a negative (−) charge is moved toward the second transparent electrode 131. In contrast, if a positive (+) voltage is applied to the first transparent electrode 111 and a negative (−) voltage is applied to the second transparent electrode 131, the white pigment 133a is moved toward the second transparent electrode 131, and the black pigment 133b is moved toward the first transparent electrode 111. At this time, polarity of the black pigment 133b and the white pigment 133a may be changed.

As described above, if an electric field is applied between the first and second transparent electrodes 111 and 131 in a state that the white pigment 133a and the black pigment 133b having different polarity are interposed between the two electrodes 111 and 131, pigment having the same polarity gathers together, thereby separating the black pigment and the white pigment to the upper side and the lower side of the capsule 133, respectively.

The present invention is directed to testing a TFT array substrate using these characteristics of electronic ink. Namely, in case that a positive (+) voltage is applied to the first transparent electrode 111 of the TFT array substrate 110 and a negative (−) voltage is applied to the second transparent electrode 131 of the modulator 135, a bright image is observed through a camera 140, which represents normal operation of a pixel. This is because the white pigment 133a assuming a negative (−) charge is distributed toward the second transparent electrode 131, and external light is absorbed by the white pigment 133a.

In addition, because the MEP film 130 and the modulator 135 can be attached and detached, the MEP film 130 and modulator 135 may be replaced to correspond to a size of the substrate to be tested. Namely, an MEP film 130 and modulator 135 appropriate to the size of a test substrate can be attached thereto.

Test substrates of various size can be accommodated through a simple program change of testing equipment without replacing the modulator 135. Namely, after the MEP film 130 is selected to fit the size of the largest test substrate 110, the program of the testing apparatus is controlled whenever a test substrate 110 is changed from one size to another. Accordingly, TFT array substrates of various size can be accommodated without replacing the modulator.

As described above, in the present invention, electronic ink including black pigment 133b that absorbs light and white pigment 133a that reflects light is interposed between the first transparent electrode 111 of the TFT array substrate 110 and the second transparent electrode 131 of the modulator 135, and the black pigment 133b and the white pigment 133a are electrically separated from each other, so that a test on whether an LCD device operates normally can be made through the brightness of an image observed through the camera 140. If an electrophorectic film has opposite polarity and reflects and absorbs light at the same time, any kinds of electrophoretic film can be used in the modulator 135 besides the electronic ink. For example, electronic paper including balls, each ball being white in one half and being black in the other half, may be used as well.

Figure 6:
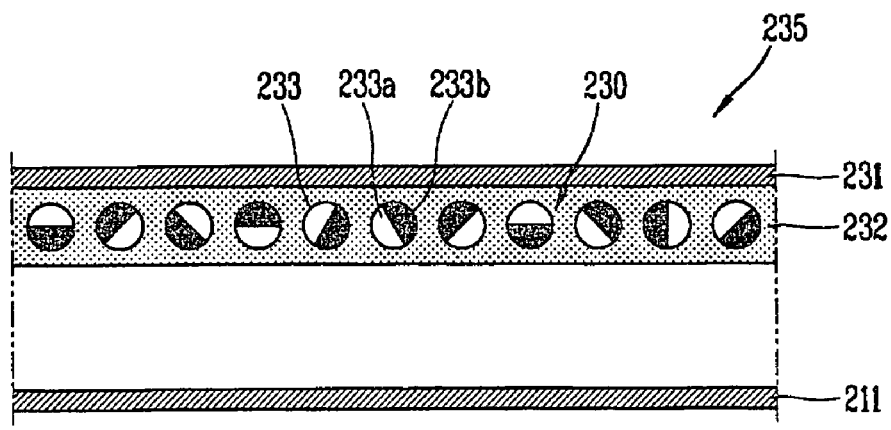
FIG. 6 is a view illustrating another embodiment of the present invention.

FIG. 6 illustrates a second embodiment of the present invention using electronic paper. As shown, a modulator 235 according to the second embodiment of the present invention uses electronic paper 230. The electronic paper 230 is obtained by mixing balls 233, each ball having white particles 233a in one half and black particles 233b in the other half, with an polymer binder 232. The white particle 233a assumes a negative (−) charge, and the black particle 233b and assumes a positive (+) charge.

As shown in FIG. 6, when an electric field is not applied between the first and second transparent electrodes 211 and 231, the balls 233 mixed with the polymer binder 232 are arranged with their white particles 233a and the black particles 233b arranged randomly. However, as illustrated in FIGS. 7A and 7B, if an electric field is applied between the two electrodes 211 and 231, the white particles 233a are rotated toward the electrode to which a positive (+) voltage is applied, and the black particles 233b are rotated toward the electrode to which a negative (−) voltage is applied.

Figure 7A:
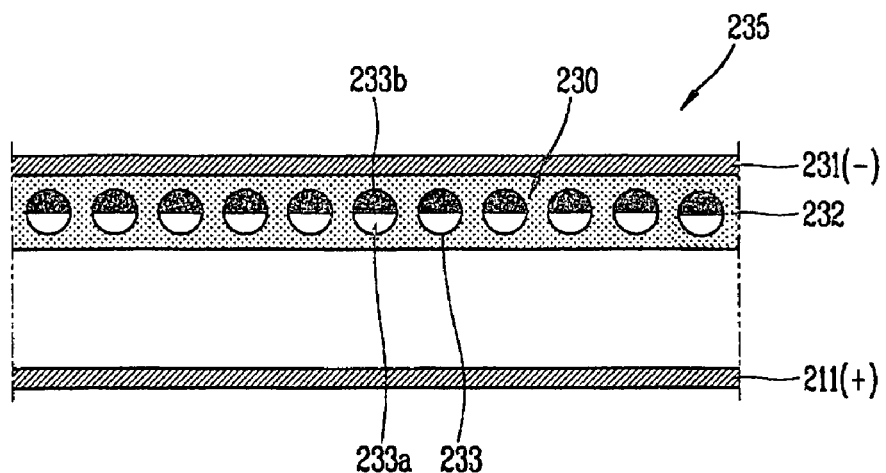
FIGS. 7A and 7B are views illustrating driving of electronic paper.

Namely, as shown in FIG. 7A, if a positive (+) voltage is applied to the first transparent electrode 211 and a negative (−) voltage is applied to the second transparent electrode 231, the white particles 233a are arranged toward the first transparent electrode 211, and the black particles 233b are arranged toward the second transparent electrode 231. Accordingly, an image observed by the camera (not shown) becomes black.

Figure 7B:
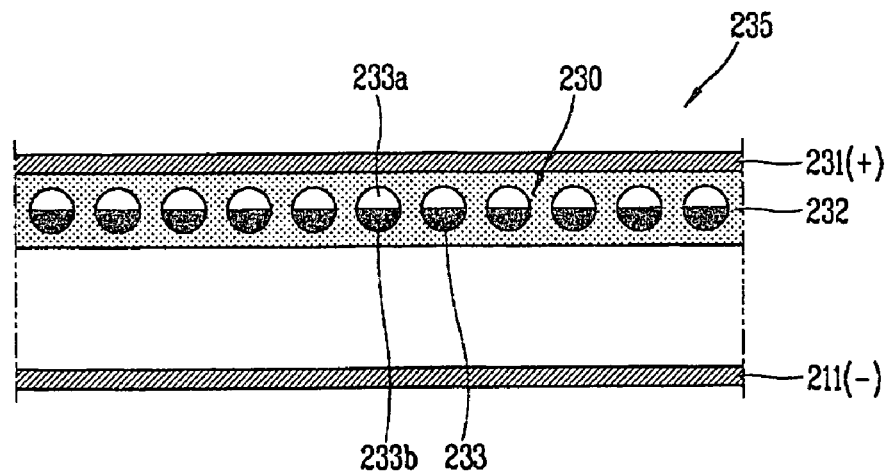

In addition, as shown in FIG. 7B, if a negative (−) voltage is applied to the first transparent electrode 211 and a positive (+) voltage is applied to the second transparent electrode 231, the black particles 233b are arranged toward the first transparent electrode 211, and the white particles 233a are arranged toward the second transparent electrode 231. Accordingly, an image observed by the camera (not shown) becomes white. In this case, polarity of the black particles 233b and the white particles 233a may be changed.

As described herein, the present invention provides an apparatus for testing an LCD device. Particularly, in the present invention, an electrophoretic film such as an MEP film or electronic paper that has an excellent reflecting characteristic is provided, so that a modulator which does not need a reflecting plate and can be fabricated in a large size can be provided. Accordingly, a testing time of the LCD device is shortened, and a test on a large size LCD device can be easily made.

As described above, by using a modulator including an electrophoretic film as a testing apparatus according to the present invention, the testing apparatus according to the present invention is suitable for a large size LCD device and can shorten a testing time, thereby improving productivity.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for testing a liquid crystal display device comprising:
    a TFT (thin film transistor) array substrate;
    a modulator installed above the TFT array substrate and including a transparent electrode on a transparent substrate and an MEP (microencapsulated electrophoretic) film; and
    a camera installed above the modulator to measure brightness of an image.

2. The apparatus of claim 1, further comprising a transparent electrode interposed between the transparent substrate and the MEP film.

3. The apparatus of claim 1, wherein the MEP film contains a polymer binder and electronic ink.

4. The apparatus of claim 3, wherein the electronic ink comprises white pigment and black pigment.

5. The apparatus of claim 4, wherein the white pigment assumes a positive (+) charge, and the black pigment assumes a negative (−) charge.

6. The apparatus of claim 4, wherein the white pigment assumes a negative (−) charge, and the black pigment assumes a positive (+) charge.

7. The apparatus of claim 1, further comprising a light source for emitting light to the modulator.

8. The apparatus of claim 1, wherein the TFT array substrate comprises:
    a transparent substrate;
    a plurality of gate lines and a plurality of data lines arranged horizontally and vertically on the transparent substrate, to define pixel regions;
    a thin film transistor formed at crossings of the gate lines and the data lines; and
    a pixel electrode formed in each pixel region and electrically connected to the thin film transistor.

9. The apparatus of claim 1, wherein one of the electrophoretic film or the modulator is replaced according to a size of the TFT array substrate.

10. An apparatus for testing a liquid crystal display device comprising:
    a TFT (thin film transistor) array substrate;
    a modulator installed above the TFT array substrate and including a transparent electrode formed on a transparent substrate and electronic paper; and
    a camera installed above the modulator to measure brightness of an image.

11. The apparatus of claim 10, wherein the electronic paper comprises balls, each ball having white particles on one half of the surface of the ball and black particles on the other half.

12. The apparatus of claim 11, wherein the white particle assumes a negative (−) charge, and the black particle assumes a positive (+) charge.

13. The apparatus of claim 11, wherein the white particles have a positive (+) charge, and the black particles have a negative (−) charge.

14. An apparatus for testing a liquid crystal display device comprising:
    a TFT (thin film transistor) array substrate;
    a modulator installed above the TFT array substrate and including a transparent electrode formed on a transparent substrate and an electrophoretic film; and
    a camera installed above the modulator measuring the brightness of an image.

15. The apparatus of claim 14, wherein the electrophoretic film or the modulator is replaced according to a size of the TFT array substrate by being detachably attached.

16. The apparatus of claim 15, wherein the particle groups of the electrophoretic film comprise black particles and white particles.

17. The apparatus of claim 14, wherein the electrophoretic film is a microencapsulated electrophoretic film.

18. The apparatus of claim 14, wherein the electrophoretic film is electronic paper.

19. A method for testing a liquid crystal display device comprising:
    providing a test substrate including a first transparent electrode;
    placing a modulator at a predetermined interval from the test substrate, the modulator including a second transparent electrode and an electrophoretic film;
    emitting light on the modulator;
    applying a voltage between the first transparent electrode and the second transparent electrode; and
    observing by a camera, the brightness of light reflected by electronic ink separated to upper and lower sides according to polarity by a voltage of the first and second transparent electrodes.

20. The method of claim 19, wherein the electrophoretic film or the modulator can be changed according to a size of the test substrate.

21. The method of claim 19, wherein the electrophoretic film is set to correspond to a maximum size of the test substrate, and test substrates of various size are accommodated by changing a program.

* * * * *